W. P. MANSFIELD.
ANIMAL TRAP.
APPLICATION FILED JAN. 3, 1914.

1,130,992.

Patented Mar. 9, 1915.

WITNESSES:
Charles Pickles
Thos Eastberg

INVENTOR
Walter P. Mansfield,
BY G. H. Strong.
ATTORNEY

UNITED STATES PATENT OFFICE.

WALTER P. MANSFIELD, OF KING CITY, CALIFORNIA.

ANIMAL-TRAP.

1,130,992.  Specification of Letters Patent.  Patented Mar. 9, 1915.

Application filed January 3, 1914. Serial No. 810,159.

*To all whom it may concern:*

Be it known that I, WALTER P. MANSFIELD, a citizen of the United States, residing at King City, in the county of Monterey and State of California, have invented new and useful Improvements in Animal-Traps, of which the following is a specification.

This invention relates to animal traps, and pertains particularly to spring traps of the character used for catching gophers, squirrels and the like.

The objects of the present invention are to provide a simple, practical spring trap which is easily and safely set without danger of the operator getting his hands caught in the trap while setting it, and which is easily released by the animal, and which will securely hold the animal when caught.

The invention consists of the parts and the combination and construction of parts as hereinafter more fully described and claimed, having reference to the accompanying drawings, in which—

Figure 1:
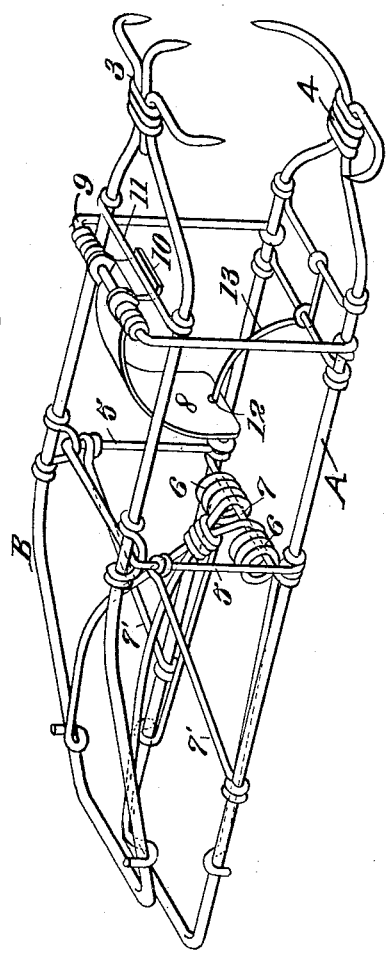
Figure 2:
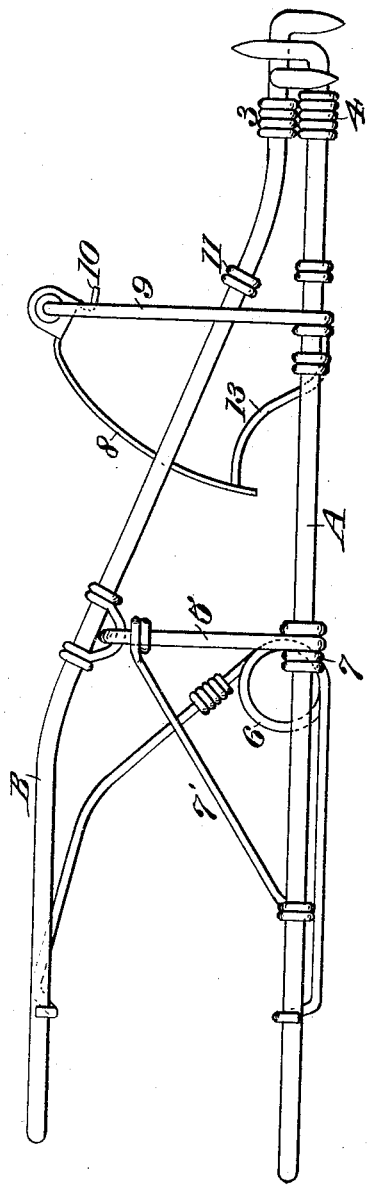

Figure 1 is a perspective view of the trap in set position. Fig. 2 is a side elevation of same in sprung position.

A and B represent two coöperating wire frames; each frame made of a continuous piece of stiff wire terminating at the front end in the respective coöperating jaws 3—4. The lower frame has at a suitable point between its ends and preferably near its middle, rigidly secured to it an upwardly extending bridge or fulcrum 5, made of wire and the upper frame B pivots centrally on this bridge 5. An extension coil spring 6 coiled about a cross bar 7 connecting the opposite sides of frame A, and having its ends connected to the frames B—A on the side of the bridge 5 opposite jaws 3—4 acts on the frames to maintain the jaws 3—4 normally closed.

7' are wire braces to hold the fulcrumed bridge 5 rigid.

The trap is inserted in a hole in the ground infested by the gopher, whereby the trap serves to close the hole, and places the trigger 8 in the direct path of the animal in any attempt of the latter to leave the hole, and since the natural tendency of the animal is to push any obstruction out of the hole, the trigger 8 will be accordingly moved to release the jaw 3.

To set the trap there is employed a sheet metal trigger 8 which fulcrums on the top of a guide wire 9, which latter has its ends braced or otherwise rigidly secured to the opposite sides of the lower frame A between the fulcrum member 5 and the jaws 3—4; wire frame 9 extending upwardly outside of the movable frame B and across the top of the latter, and in itself insuring always the proper alinement of the jaws 3—4. The trigger plate 8 has a hook member 10 at its upper shorter end to engage under a cross piece 11 on the movable frame B when the jaws are open, and the lower end of the trigger has a perforation 12 to engage a slightly resilient sear or pin detent 13 on the stationary frame A to hold the trigger 8 and thereby the jaw 3 set.

The trap is easily set by using the rear projecting portion of the frames A—B behind the fulcrum 5 as a handle, not requiring the operator to work with his hands close to the jaws and run any danger from infection, or injury by the accidental slipping or release of the jaws. The trap is released by the animal pushing against the trigger plate 8.

Having thus described my invention what I claim and desire to secure by Letters Patent is—

An animal trap consisting of a pair of spring actuated jaws, an arched guide carried by one of the jaws, a sear carried by the other jaw, and a trigger pivoted to the guide and adapted to be engaged by the sear to hold the jaws in set position.

In testimony whereof I have hereunto set my hand in the presence of two subscribing witnesses.

WALTER P. MANSFIELD.

Witnesses:
N. FORDEN,
E. W. MILLER.

Copies of this patent may be obtained for five cents each, by addressing the "Commissioner of Patents, Washington, D. C."